(12) United States Patent
Li et al.

(10) Patent No.: US 12,045,961 B2
(45) Date of Patent: Jul. 23, 2024

(54) IMAGE DENOISING METHOD AND APPARATUS BASED ON WAVELET HIGH-FREQUENCY CHANNEL SYNTHESIS

(71) Applicant: ZHEJIANG LAB, Zhejiang (CN)

(72) Inventors: Jingsong Li, Hangzhou (CN); Jinnan Hu, Hangzhou (CN); Peijun Hu, Hangzhou (CN); Yu Tian, Hangzhou (CN); Tianshu Zhou, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/489,876

(22) Filed: Oct. 19, 2023

(65) Prior Publication Data
US 2024/0161251 A1 May 16, 2024

(30) Foreign Application Priority Data
Nov. 11, 2022 (CN) .......................... 202211414188.5

(51) Int. Cl.
*G06T 5/70* (2024.01)
*G06T 5/10* (2006.01)

(52) U.S. Cl.
CPC .................. *G06T 5/70* (2024.01); *G06T 5/10* (2013.01); *G06T 2207/20064* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 2013/0022288 A1 | 1/2013 | Sartor |
| 2018/0089863 A1* | 3/2018 | Marschner ....... G01R 33/56545 |

(Continued)

FOREIGN PATENT DOCUMENTS

| CN | 104751477 A | 7/2015 |
| CN | 113256508 A * | 8/2021 |

(Continued)

OTHER PUBLICATIONS

Notice of Allowance(CN202211414188.5); Date of Mailing: Jan. 13, 2023.

(Continued)

*Primary Examiner* — Jiangeng Sun
(74) *Attorney, Agent, or Firm* — W&G Law Group

(57) ABSTRACT

Disclosed is an image denoising method and apparatus based on wavelet high-frequency channel synthesis. Image data are expanded to a plurality of frequency-domain channels, a plurality of "less-noise" channels and a plurality of "more-noise" channels are grouped through a noise-sort algorithm, and a denoising submodule and a synthesis submodule based on style transfer are combined to form a generative network. A discriminative network is established to add a constraint to the global loss function. After iteratively training the GAN model described above, the denoised image data can be obtained through wavelet inverse transformation. The disclosed algorithm can effectively solve the problem of "blurring" and "loss of details" introduced by traditional filtering or CNN-based deep learning methods, which is especially suitable for noise-overwhelmed image data or high dimensional image data.

10 Claims, 12 Drawing Sheets

(56) References Cited

U.S. PATENT DOCUMENTS

| | | | | |
|---|---|---|---|---|
| 2020/0209339 A1* | 7/2020 | Hsu | .................. | G01S 3/8022 |
| 2020/0367853 A1* | 11/2020 | Yoo | .................. | A61B 8/085 |
| 2021/0106281 A1* | 4/2021 | Tran | .................. | A61B 5/486 |
| 2022/0414954 A1* | 12/2022 | Ye | ............................ | G06T 5/60 |

FOREIGN PATENT DOCUMENTS

| | | |
|---|---|---|
| CN | 113256536 A | 8/2021 |
| JP | 2020184693 A | 11/2020 |
| WO | 2008067479 A1 | 6/2008 |

OTHER PUBLICATIONS

First Office Action(CN202211414188.5); Date of Mailing: Dec. 26, 2022.
Denoising-of-SAR-Images-Based-on-Lifting-Scheme-Wavelet-Packet-Transform.
Study-on-Image-Denoising-Algorithm-and-Noise-Estimation.
Adaptive-wavelet-fitte-with-edge-compensation-for-remote-sensing-image-denoising.

* cited by examiner

Comparison of CT (abdominal window) denoising effect (peak signal-to-noise ratio, structural similarity index measure)

IMAGE DENOISING METHOD AND APPARATUS BASED ON WAVELET HIGH-FREQUENCY CHANNEL SYNTHESIS

CROSS-REFERENCE TO RELATED APPLICATIONS

The present application claims priority to Chinese Patent Application No. 202211414188.5, filed on Nov. 11, 2022, the content of which is incorporated herein by reference in its entirety.

TECHNICAL FIELD

The present disclosure relates to the fields of medical image analysis, video analysis and the like, and in particular, to an image denoising method and apparatus based on wavelet high-frequency channel synthesis.

BACKGROUND

1. Wavelet Package Transformation.

Wavelet transformation was originally proposed to solve the problem of loss of time domain information in Fourier Transform. In the field of image processing, fast discrete wavelet transformation applies a series of filters to expand image information into different independent frequency domain sub-bands and express them with wavelet coefficients. After decomposed by a set of orthogonal wavelet bases, the original image is actually divided into high-frequency components and low-frequency components by a set of filters. On this basis, wavelet package transformation can further decompose one or some frequency domain components of each level as required. Generally, the size of an m-order wavelet package coefficient of n-dimensional image data is the $1/2^{mn}$ of the original image, and the decomposition method is shown in FIG. 1. By performing first-order wavelet transformation on a two-dimensional image, wavelet decomposition subgraphs "aa", "ad", "da" and "dd" in four frequency sub-channels can be obtained, where "a" is a low-pass filter and "d" is a high-pass filter, that is, the "ad" subgraph represents the low-frequency information of the first dimension and the high-frequency information of the second dimension of the original image, and the subgraph size is ¼ of the original image. If the "da" subgraph is subject to second-order wavelet package transformation, four second-order wavelet package subgraphs "daaa", "daad", "dada" and "dadd" can be obtained. Through the wavelet package transformation of the original image and the ground-truth image, the signal-to-noise ratio of each channel subgraph can be calculated, and each wavelet channel can be divided into "less-noise group" and "more-noise group" according to the empirical threshold. Theoretically, wavelet package inverse transformation can reconstruct the original high-dimensional image without distortion, which is an important theoretical basis for this technical method to realize data frequency domain expansion.

2. Convolutional Neural Network Based on Residual Learning (DnCNN)

Convolutional Neural Network (CNN) is popular in the image processing field, which usually consists of a convolution layer, a pooling layer, and an activation layer. The convolution layer is the core of CNN, which extracts image features through a series of filters and generates feature maps; the pooling layer introduces invariance to CNN, and at the same time downsamples and expands the receptive field of the next convolution kernel, such that the network will learn the features of images at different scales; the activation layer is usually a nonlinear function, which makes the network better fit any function and also alleviates the over-fitting problem of the over-deep network. The residual learning of DnCNN is connected end to end, and the network output is changed into residuals, so the optimization goal of the network is image noise. The structure of the convolutional neural network based on residual learning is shown in FIG. 2.

3. Style Transfer Neural Network Based on U-net

A U-net is a powerful reconstruction network, which was first used in the field of semantic segmentation, and then commonly used in the field of style transfer. Different from the simple encoder-decoder structure, the U-net also designs a unique skip-layer connection, which concatenates the cropped features before encoding into the features with the same size, helping the decoder to lose as little detailed information as possible in the process of restoring pixels. The encoder includes several convolution kernels, which are responsible for extracting the detailed features in this receptive field to form feature maps; the role of the pooling layer is as described in CNN above, introducing invariance and downsampled images. The decoder also contains several convolution kernels. After the encoding, some feature maps cropped from the decoder with the same size are concatenated through skip-layer connection, which ensures that the upsampler uses the image features learned by the encoder and the decoder at the same time when recovering pixels. Corresponding to the pooling layer of the encoder, the decoder uses an upsampler to recover pixels, usually using a deconvolution algorithm or an interpolation algorithm. Before each convolutional layer and pooling layer, the U-net uses a batch normalization layer to normalize the data and calibrate the data distribution that may produce offsets. The activation function usually uses a rectified linear element (ReLU) in order to introduce nonlinear factors and make the network better fit the data distribution.

Style transfer networks often use affine transformation to provide "style" for reconstruction networks through a latent space model. The latent space model includes several convolution layers, batch normalization layers, activation layers, and pooling layers, which are used to extract the original data features and then map them into the latent space, and the affine transformation layer is used to provide reconstruction details. The affine transformation layer incorporates the features in the latent space with the output of the decoder in a U-net synthesis network in the form of matrix multiplication and matrix addition. If $M \in R^{C \times H \times D}$ is the output of the decoder, c, x, y is the number and size of channels changed to the decoder output, $\alpha_{c,x,y}^{i}$ is the multiplicative coefficient of the $i^{th}$ layer affine transformation output and $\beta_{c,x,y}^{i}$ is the additive coefficient of the $i^{th}$ layer affine transformation output, then the mathematical expression of the affine transformation layer output is formula (1). The network structure of style transfer based on U-net is shown in FIG. 3.

$$f^i(M) = \alpha_{c,x,y}^{i} M_{c,x,y} + \beta_{c,x,y}^{i} \qquad (1)$$

4. Generative Adversarial Network (GAN)

A GAN network architecture is composed of a generator and a discriminator, which is widely used in image generation tasks. The core idea of GAN is to make the two networks compete with each other. From the generator's point of view, it tends to reduce the discriminative accuracy of the discriminator, that is, it tries to generate images similar to the ground truths in order to fool the discriminator. The discriminator constantly improves the auditing standard, to distinguish the difference between the output image of the generator and the real image. According to the related research of style transfer, the traditional deep learning reconstruction network with a mean square error (MSE) as a loss function is prone to the "loss of details" and the "blurring", while the generator-discriminator training structure of the GAN network effectively adds constraints to the generator's training, making it easier to restore the mapping relationship between a source domain and a target domain in image reconstruction.

Generally, the output of the discriminator is one-dimensional probability $\in[0,1]$, and the generated image is given a prediction label through an intermediate threshold, and then the loss function of the discriminator is obtained after comparing with the real label. The generator will incorporate the generator loss and the discriminator loss for the back propagation and update the network weight iteratively. The training process of GAN is shown in FIG. 4.

SUMMARY

In order to overcome the problems of "blurring" and "loss of details" that appeared in the existing denoising methods, the present disclosure provides an image denoising method and apparatus based on wavelet high-frequency channel synthesis, and the detailed information of the image data is effectively restored through the reconstruction of wavelet high-frequency and the constraint of the discriminator. The present disclosure creatively proposes to expand the frequency domain information of image data by using wavelet package transformation, reconstruct the high-frequency coefficients by using a synthesis network, and optimize a denoising submodule and a synthesis submodule in combination with a generative adversarial neural network, thus effectively solving the blurring effect generated by the traditional image denoising algorithms and the CNN-based methods.

The present disclosure is realized by the following technical solution: an image denoising method based on wavelet high-frequency channel synthesis; the method includes the following steps:

S1, obtaining a noisy or high-dimensional image and preprocessing them;

S2, wavelet package transformation, and wavelet package coefficient grouping, wherein the preprocessed images and ground-truth images are decomposed into wavelet package coefficients with different frequency sub-channels by wavelet package transformation, signal-to-noise ratios are calculated respectively, and a "less-noise group" and a "more-noise group" are formed according to a signal-to-noise ratio threshold;

S3, establishing a neural network, comprising a denoising submodule and a synthesis submodule, wherein the denoising submodule is a convolution neural network based on residual learning, and the synthesis submodule is a convolution neural network based on style transfer; and S4, generative adversarial model training, which is specifically as follows:

S41, pretraining a generative network, and performing supervised training on the two networks in the S3 respectively;

S42, reconstructing data, wherein an input of the denoising submodule is "less-noise group" wavelet coefficients, and an output thereof is denoised "less-noise group" coefficients, while an input of the synthesis submodule is the "less-noise group" wavelet coefficients and original image data, and an output thereof is a group of synthesized wavelet coefficients corresponding to "more-noise group" data; performing inverse wavelet package transformation on the output of the denoising submodule and the output of the "more-noise group" of the synthesis submodule, to jointly reconstruct the original image data; and S43, establishing a discriminative network, inputting the reconstructed original image data into the discriminative network; by combining the generative network, performing training to the generative adversarial model, and finally reconstructing the image data based on the trained generative model, namely a denoised image.

Further, in step S1, image preprocessing comprises data normalization, data augmentation, and data normalization;

the data normalization: normalizing original data and corresponding ground truth data by using a unified graphic coding format;

the data augmentation: expanding a database by means of clipping, interpolation, rotation, and translation; and the data normalization: unifying data dimensions by a normalized method.

Further, in step S2, original image data and ground-truth image data thereof obtained through wavelet package decomposition are divided into a "less-noise group" and a "more-noise group" by calculating signal-to-noise ratios and the signal-to-noise ratio threshold value is set by experience; "less-noise group" wavelet coefficients of an original noisy image are concatenated by channels to be used as inputs of the denoising submodule and a synthesis submodule subsequently; "less-noise group" and "more-noise group" wavelet package coefficients corresponding to a ground truth image are concatenated by channels to be subsequently used as supervised training labels of the denoising submodule and the synthesis submodule, respectively.

Further, in step S3, the convolution neural network based on residual learning is configured to denoise the "less-noise group" wavelet package coefficients; and the network comprises a plurality of convolution layers, activation layers, batch normalization layers, a head and tail residual connection is certainly comprised therein.

Further, in the step S3, the convolution neural network based on style transfer is configured to synthesize the "more-noise group" wavelet package coefficients; the network comprises a reconstruction network based on U-net, a latent space network, and affine transformation layers. A U-net comprises a plurality of groups of corresponding encoders and decoders, and the corresponding encoders and the decoders are connected to fuse the multi-dimension feature maps; the latent space network comprises a plurality of convolution layers, pooling layers, batch normalization layers, and activation layers; the affine transformation layer transforms the features generated in a latent space model into a U-net decoder in the form of matrix multiplication and matrix addition; an input of the convolution neural network based on style transfer is the "less-noise group" wavelet coefficients, and an input of the latent space network is an original image, and a final output is a synthesized wavelet package coefficient corresponding to the "more-noise group".

Further, in step S41, the "less-noise group" wavelet package coefficients are forward to pass through the denoising submodule and the synthesis submodule, respectively, and neural network predicted values are obtained respectively; a loss function is calculated according to the predicted values and corresponding true labels, backpropagation is performed to obtain a gradient; a network weight is updated by using a gradient descent algorithm, and two neural networks are optimized iteratively until the neural network is convergent.

Further, in step S43, the discriminator based on the convolution neural network is established, and the network comprises a plurality of convolution layers, batch normalization layers, pooling layers, and activation layers; and an input of a discriminative network is an reconstructed image through wavelet inverse transformation, and an output is a one-dimensional probability $\in[0,1]$.

Further, in step S43, the reconstructed images in S42 are provided with negative labels, the ground-truth images are provided with positive labels and fed forward to the discriminator; a classification loss is calculated before the back propagations of the denoising submodule and the synthesis submodule respectively, and two generative networks are optimized by using a random gradient descent algorithm; and wherein repeated iterative optimization, when the loss functions of the generative networks and the discriminative network reach a dynamic balance, the training is completed.

In a second aspect, the present disclosure provides an image-denoising apparatus based on wavelet high-frequency channel synthesis; the apparatus includes a memory and one or more processors, the memory storing an executable code, wherein the processor, when executing the executable code, is configured to implement the step of the image denoising method based on wavelet high-frequency channel synthesis.

In a third aspect, the present disclosure provides a computer readable storage medium, storing a program, wherein the program, when executed by a processor, implements the step of the image denoising method based on wavelet high-frequency channel synthesis.

The method has the advantages that the image data is expanded to a plurality of frequency channels by using wavelet package transformation, and the denoising network is replaced by a reconstruction network in the more-noise wavelet package coefficients (high-frequency components) because in the frequency domain with a low signal-to-noise ratio, the performance of the denoising algorithm is greatly over-estimated; the high-frequency signal is shown as the detailed information in the original image, thus effectively solving the problem of "loss of details" caused by the existing algorithm; in addition, the use of a discriminator and the training in GAN architecture have solved the "blurring" effect resulted from convolutional-based networks using global pixel errors (e.g. mean square errors and root mean square errors) as loss functions to some extent.

DESCRIPTION OF EMBODIMENTS

The technical solution of the present disclosure will be further described completely and clearly with an example of the present disclosure. Note that the following example is only an application of the present disclosure and is not a complete implementation example. Based on the technical framework of the present disclosure, in addition, all applications obtained by users without creative labor belong to the protection scope of the present disclosure.

The present disclosure provides an image denoising method based on wavelet high-frequency channel synthesis, aiming at a deep learning method for denoising noisy or high-dimensional image data, and effectively solving the problem that the existing method currently loses image details. The present disclosure finds that the image noise is more uniform than the image signal in the frequency domain, that is, after the original image signal is expanded to different frequency channels by wavelet package transformation, the signal-to-noise ratio is quite different, and the high-frequency wavelet package coefficient often has the characteristic of a low signal-to-noise ratio. Therefore, the method creatively uses a neural network based on style transfer to reconstruct the noisy high-frequency signal of the image. In addition, the present disclosure uses a generative adversarial neural network to add constraints to the loss functions of the denoising submodule as well as the synthesis submodule and further optimizes the ability of the model to retain detailed features.

Figure 1:
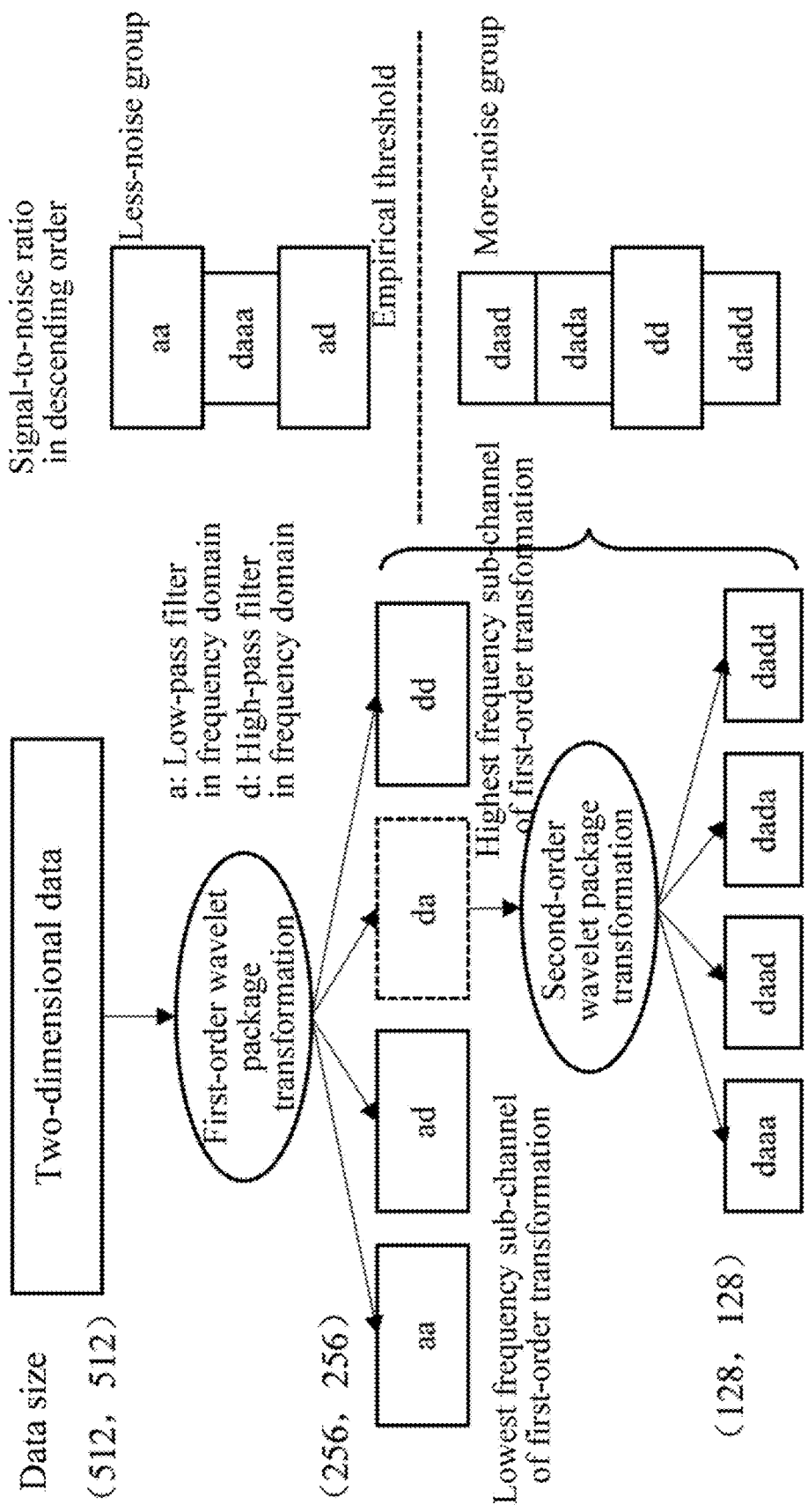
FIG. 1 is a schematic diagram of wavelet package transformation and noise grouping.
Figure 2:
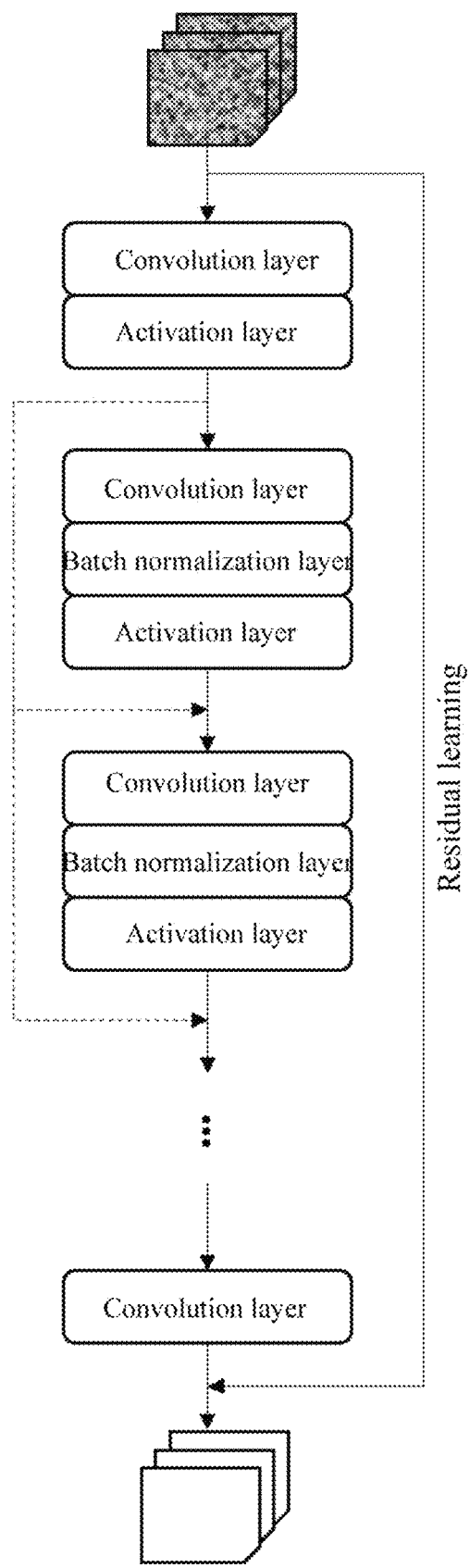
FIG. 2 is a schematic structure diagram of a convolutional neural network (DnCNN) based on residual learning.
Figure 3:
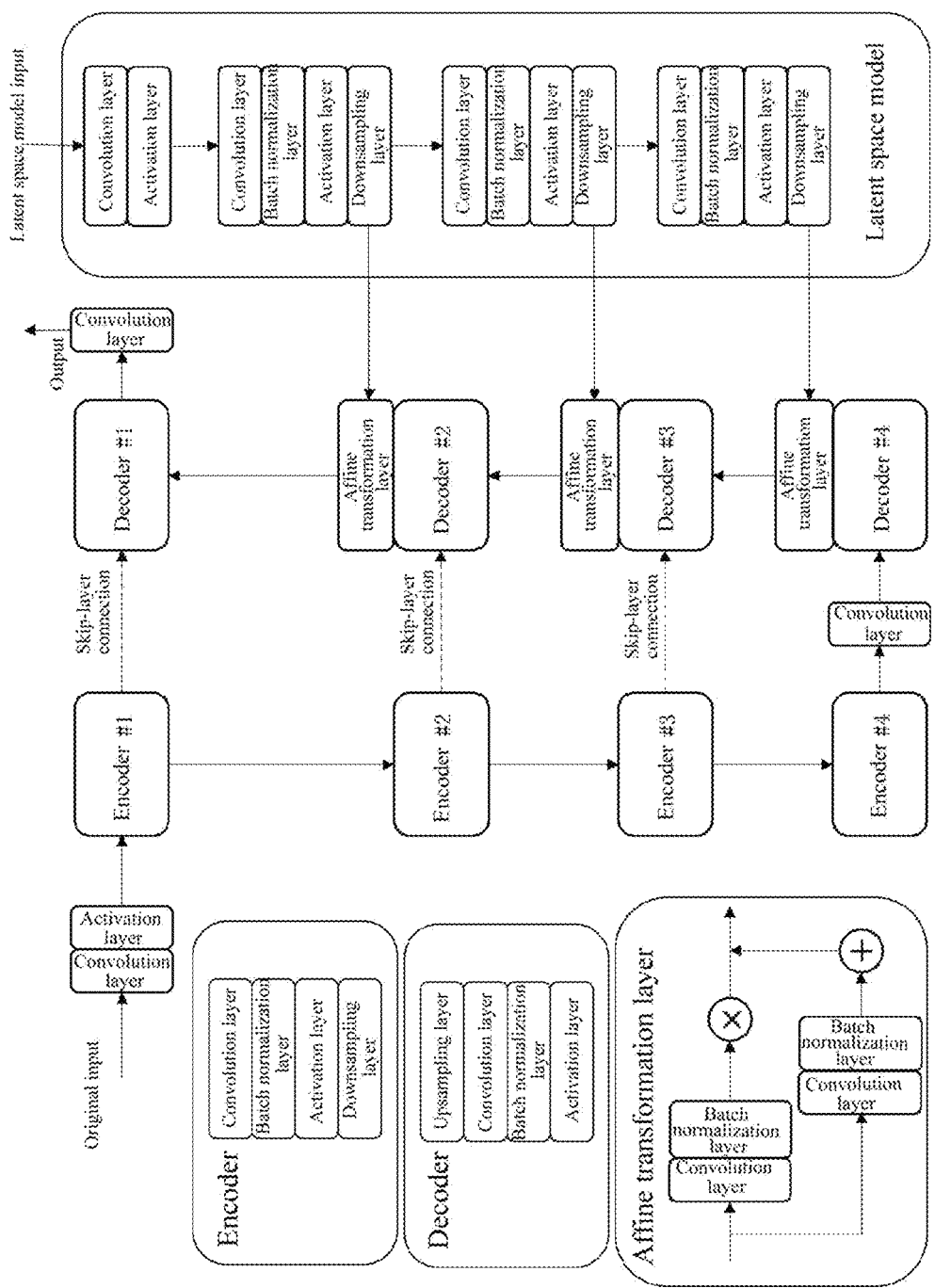
FIG. 3 is a structural diagram of a style transfer network structure based on a U-net.
Figure 4:
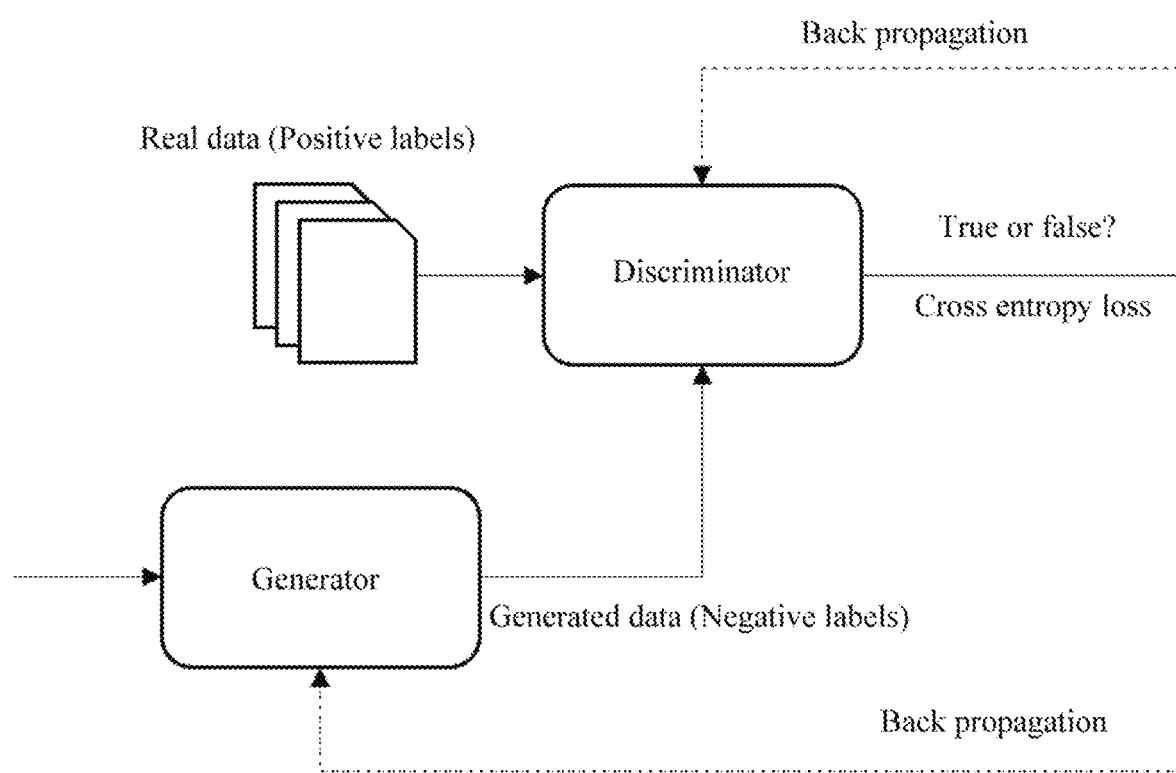
FIG. 4 is a schematic diagram of GAN network training.
Figure 5:
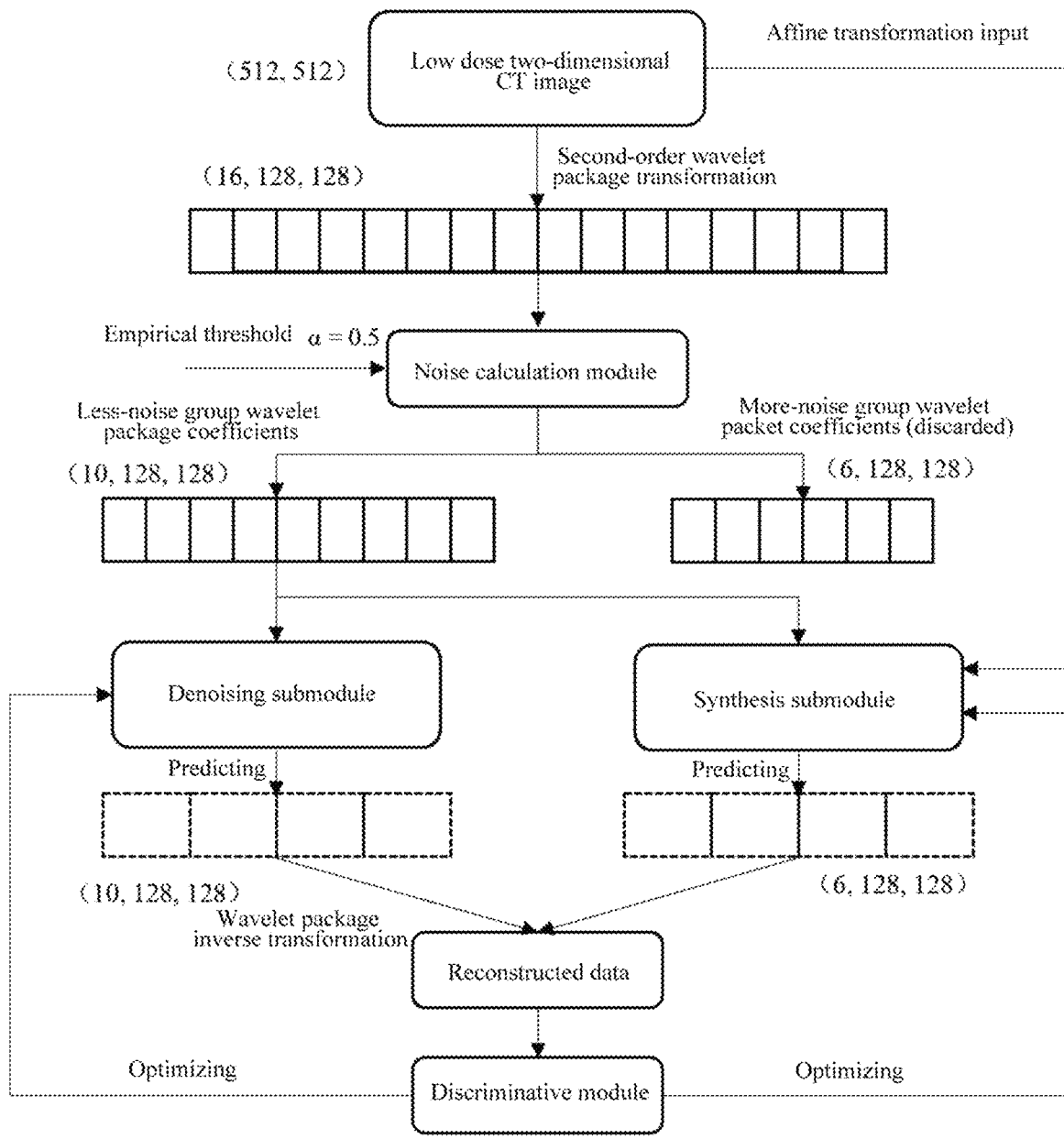
FIG. 5 is a flowchart of an example of the system of two-dimensional low-dose CT denoising.

CT (Computed Tomography) is widely used in contemporary clinical diagnosis. Generally, high-dose radiation can generate high signal-to-noise ratio images, but it also brings potential health risks to the scanned human body. Therefore, the post-processing denoising of low-dose CT images has become a widely discussed topic in the industry. FIG. 5 describes the flowchart of denoising low-dose CT under the technical framework introduced by the present disclosure.

Step 1, data preprocessing:

1-1) Data normalization: the noisy low-dose CT image data is decomposed by wavelet package transformation using first-order Haar, in which the average signal-to-noise ratio of one or more wavelet package coefficients is less than or equal to 0.5; this image data often appears noise-overwhelmed (a low signal-to-noise ratio) or high dimensional (three dimensions and above). The 2D low-dose CT slices and ground-truth data are unified into a single-channel (grayscale) format of NIFTI-1 with a size of 512×512, and the database is expanded by clipping, interpolation, rotation, and translation.

1-2) Data normalization: a normalization method is used to unify the pixel value of the original image to (0, 255).

Step 2, wavelet package transformation and wavelet package coefficient grouping: by using wavelet package transformation, the preprocessed image data and ground-truth image data are decomposed into wavelet package coefficients in different frequency sub-bands, and the signal-to-noise ratio is calculated respectively, and a "less-noise group" and a "more-noise group" are formed according to a signal-to-noise ratio threshold.

2-1) Wavelet package transformation: Daubechies with a vanishing moment of 1 is used to perform second-order wavelet package transform on low-dose CT images and ground-truth images, that is, a 512×512 CT image is transformed into 16 128×128 wavelet package coefficients (frequency domain components) by second-order wavelet package transformation.

2-2) Noise calculation and wavelet package coefficient grouping: the average SNR of 16 frequency channels of all CT images in the database after second-order wavelet package transformation is calculated. See formula (2), N is the number of CT images, and $\sigma_s$, $\sigma_c$ are the standard deviations of the wavelet package coefficients of the original image and the ground-truth image respectively.

$$SNR = \frac{1}{N}\sum_{i=1}^{N}\left(\frac{\sigma_{s,i}^2}{\sigma_{s,i}^2 - \sigma_{c,i}^2}\right) \quad (2)$$

The empirical threshold of the present disclosure is α=0.5, that is, when the average signal-to-noise ratio SNR of the decomposed sub-frequency channel is greater than 0.5, the wavelet package coefficients in the frequency channel are classified as "less-noise group", and otherwise they are classified as "more-noise group".

2-3) After the calculation in step 2-2), if 10 of wavelet package coefficients are classified as "less-noise group" and 6 of them are classified as "more-noise group", the data size of the "less-noise group" concatenated by channels is (10, 128,128) and that of "more-noise group" is (6,128,128). The "less-noise group" wavelet coefficients of the original noisy image are used as the inputs of the denoising submodule and the synthesis submodule, and the "less-noise group" wavelet coefficients and "more-noise group" wavelet coefficients of the ground-truth image are used as the supervised labels of the denoising submodule and the synthesis submodule, respectively.

Step 3, a denoising submodule network is established for denoising the wavelet package coefficients of the "less-noise group".

Figure 6:
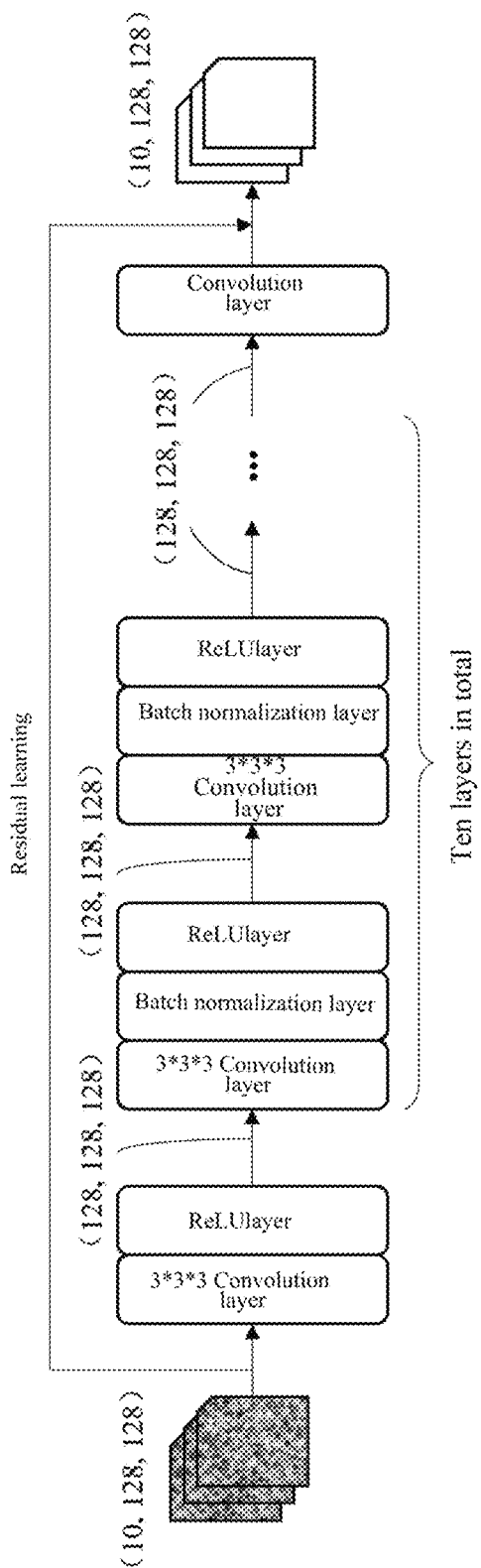
FIG. 6 is a schematic diagram of an exemplary denoising submodule of the present disclosure.

3-1) A convolutional neural network based on residual learning (DnCNN) is constructed: the DnCNN consists of 12 three-dimensional convolution layers with a convolution kernel of 3×3×3, with a zero-padding value of 1 and a stride of 1; 10 batch normalization layers and 11 ReLU (Rectified Linear Unit) layers. The input channel of the network is the "less-noise group" data channel, which consists of 10 channels. The middle channel is 128, and the output channel is 10; the network is connected end to end, and the network structure is shown in FIG. 6.

Step 4, a synthesis submodule network is established for synthesizing the wavelet package coefficients of the "more-noise group".

4-1) A neural network based on U-Net is established: the network includes four encoders and decoders; the encoder includes two three-dimensional convolution layers with a convolution kernel of 3×3×3, a zero-padding value of 1, and a stride of 1, a batch normalization layer, a ReLU layer and a max-pooling layer of 2×2×2; the decoder includes an up-sampling layer using bilinear interpolation algorithm, two convolution layers with a convolution kernel of 3×3×3, a zero-padding value of 1 and a stride of 1, a batch normalization layer, a ReLU layer, and an affine transformation layer.

Figure 7:
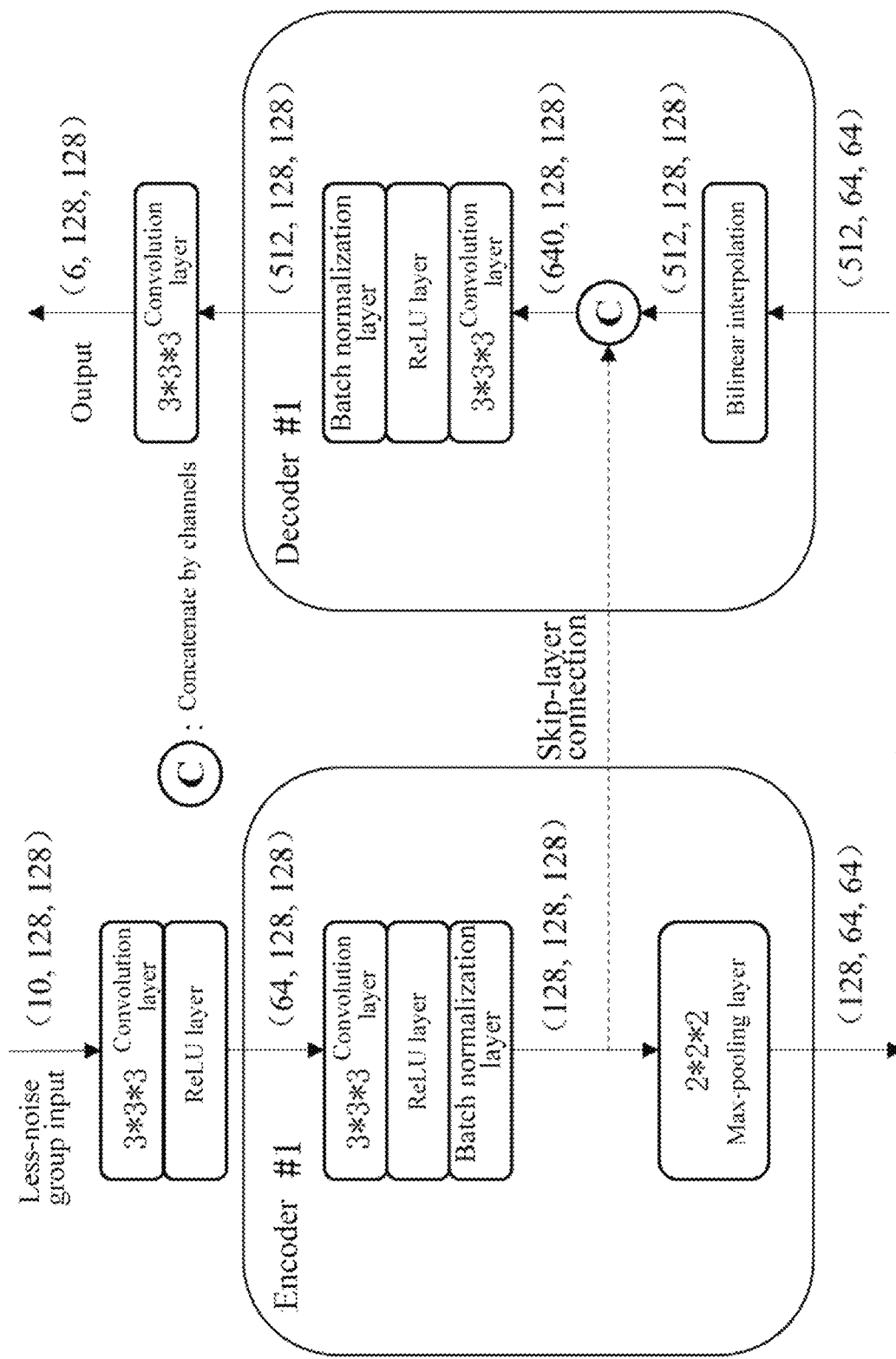
FIG. 7 is a schematic diagram of the top codec of an exemplary synthesis submodule.
Figure 8:
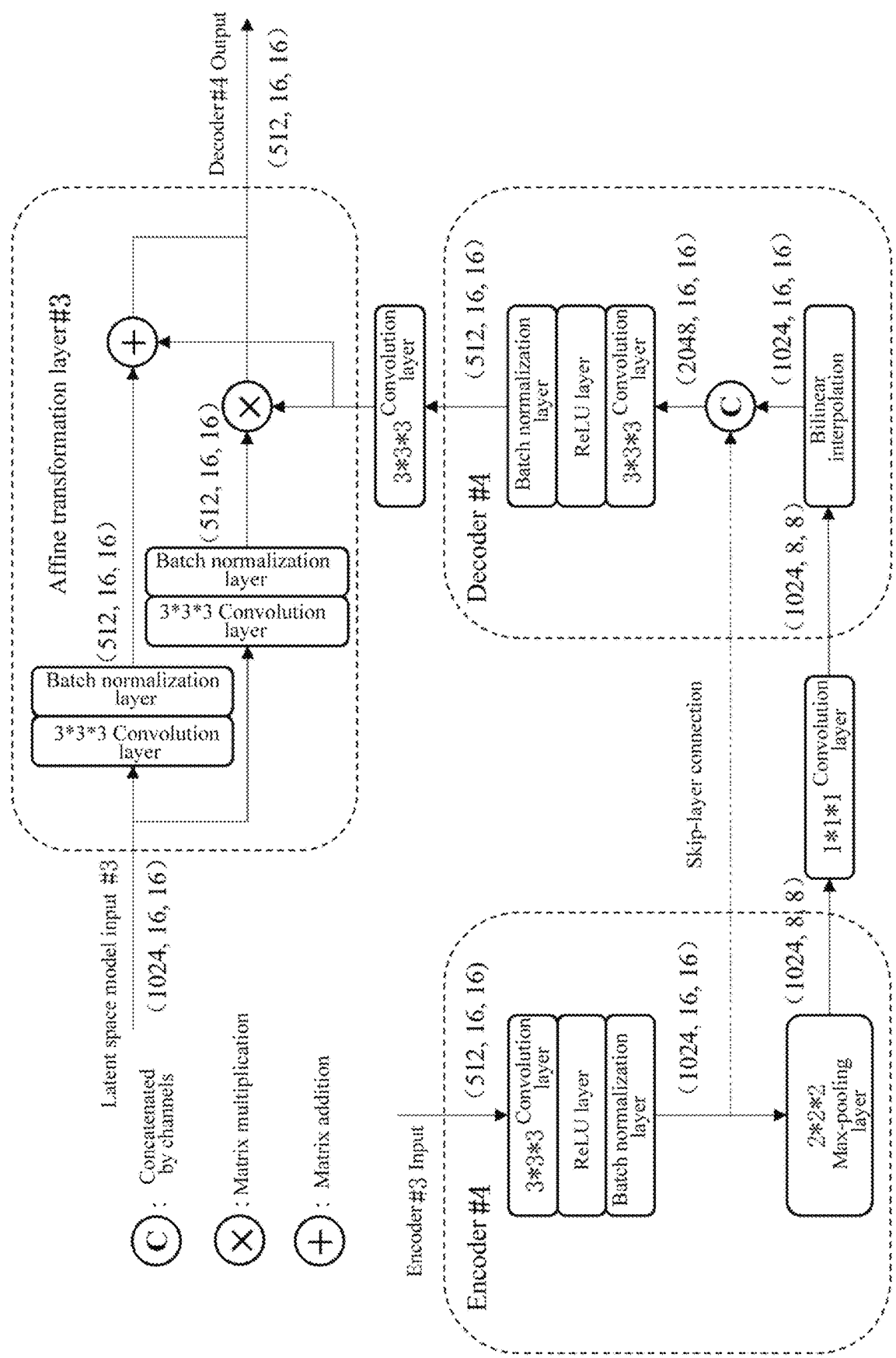
FIG. 8 is a schematic diagram of the bottom codec of an exemplary synthesis submodule.

Before matrix addition and matrix multiplication in the affine transformation layer, there are three-dimensional convolution layers with a convolution kernel of 3×3×3, a zero-padding value of 1, and a stride of 1 respectively. The input channel of the network is the "less-noise group" data channel, which consists of 10 channels, and the output channel is the "more-noise group" data channel of 6. Codecs at the same level use skip-layer connections to concatenate multi-scale feature maps. FIG. 7 and FIG. 8 are schematic diagrams of the top and bottom codecs of the network, respectively.

Figure 9:
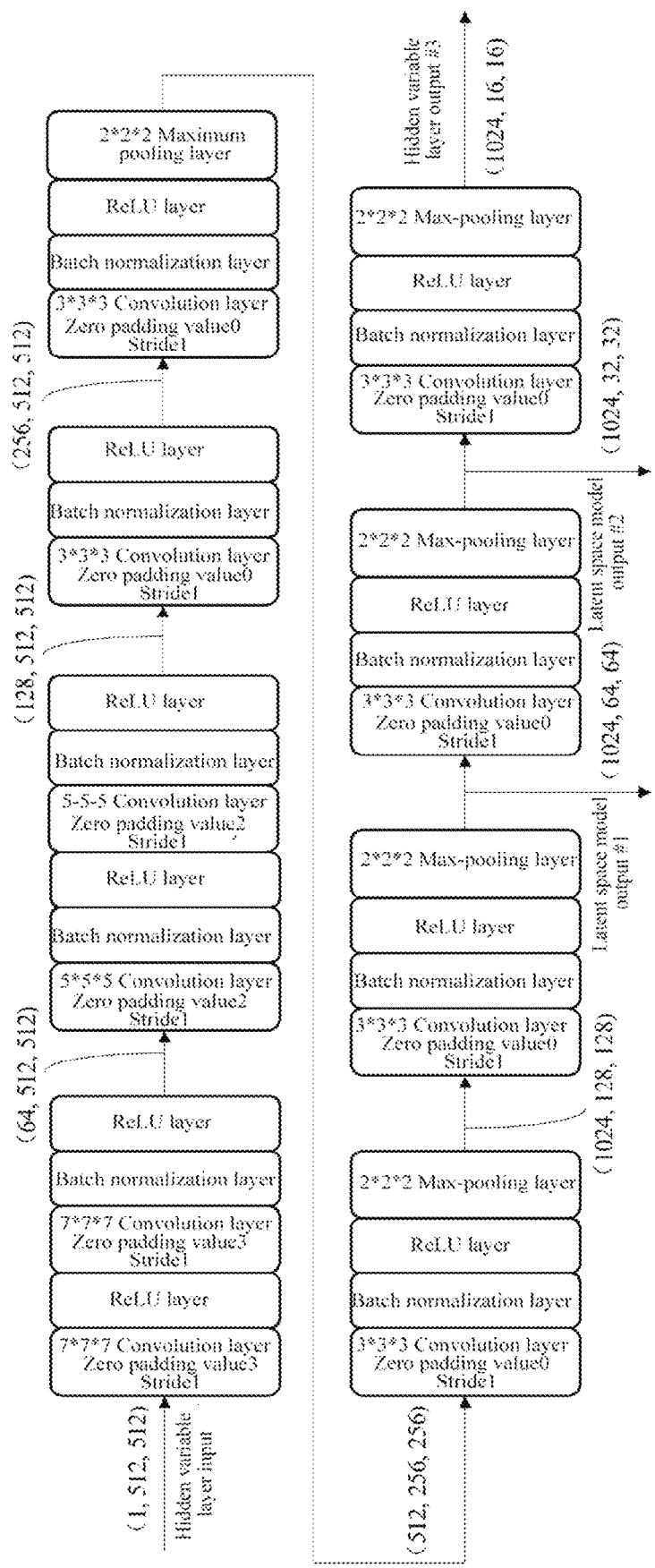
FIG. 9 is a schematic diagram of a latent space network structure of the exemplary synthesis submodule.

4-2) The latent space network consists of two convolution layers with a convolution kernel of 7×7×7, a zero padding value of 3 and a stride of 1, two convolution layers with a convolution kernel of 5×5×5, a zero padding value of 2, and a stride of 1, and six convolution layers with a convolution kernel of 3×3×3, a zero padding value of 1 and a stride of 1, i.e., a total of 10 convolution layers, nine batch normalization layers and ten activation layers; the input of the latent space network is the original data, so the input channel is 1, and the output is the feature map with different scales in multiple channels; as the input of the affine transformation layer in the decoder, the feature map introduces information from different scales for synthesizing the details of the wavelet package high-frequency channels. The structure of the latent space network is shown in FIG. 9.

Figure 10:
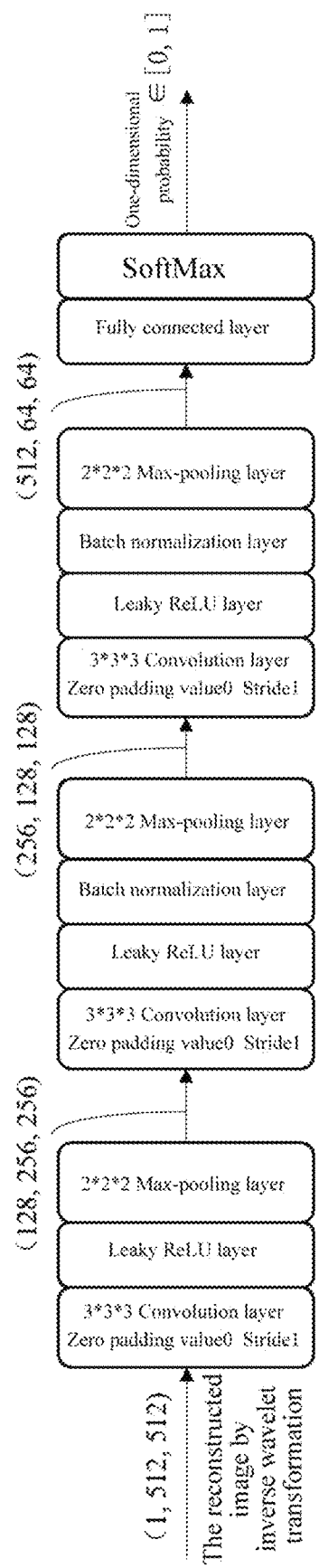
FIG. 10 is a schematic diagram of an exemplary discriminative network structure.

Step 5, a discriminative network is established:

5-1) A discriminator based on a convolutional neural network is established: the network includes three convolution layers with a convolution kernel of 3×3×3, a zero-padding value of 0 and a stride of 1, one batch normalization layer, two Leaky ReLU layers, a fully connected layer and a softmax layer; the input channel of the discriminative network is 1 and the output is one-dimensional probability ∈ [0,1]. The discriminative network structure is shown in FIG. 10.

Step 6, network training:

6-1) The network convolution layer weights are initialized by the standard normal distribution.

6-2) Supervised pre-training of the denoising submodule network and synthesis submodule network: the "less-noise group" wavelet coefficients obtained in step 2 are the input of the denoising submodule network and synthesis submodule network respectively, and the original image data are the input of the latent space network in the synthesis submodule; the data are compared with the ground truths to obtain the mean square error which is the loss function, then a back-propagation algorithm is used to obtain a gradient, an adaptive momentum estimation (Adam) optimizer is used to update the network weights; a complete feed-forward process and backward propagation is an iteration; the learning rate is set to 0.0005 in the first 50 iterations and 0.0001 in the last 50 iterations; after 100 iterations, the network loss function basically converges.

6-3) Data reconstruction: after the network training converges, the original noisy or high-dimensional data can be reconstructed from the predicted values of the denoising submodule and the synthesis submodule through the wavelet package inverse transformation.

6-4) Training of a generative adversarial network: the data reconstructed in step 6-3) are set to be negative labels, and the ground-truth images are set to be positive labels, serving as the training set together to be fed forward into the discriminator; the loss function is the average of cross entropy loss concerning with false positive samples and false negative samples; after the gradient is obtained by the backpropagation algorithm, the weights of discriminative network are updated by the adaptive momentum estimation (Adam) optimizer; then, the loss of the discriminator is multiplied by 25 and added to the loss functions of the denoising submodule and the synthesis submodule respectively, subsequently, the weights of the two networks are updated after the back propagations; at this time, it is an iteration of GAN training; with a learning rate of 0.0001, after 80 iterations of optimization, the loss function of the generative network and the discriminative network will reach a balance, and the training is finished at this time.

Step 7, model evaluation.

7-1) Quantitative evaluation: the model output (signal after wavelet reconstruction) is quantitatively evaluated using a mean square error (MSE), a peak signal-to-noise ratio (PSNR), and a structural similarity index measure (SSIM).

Figure 11:
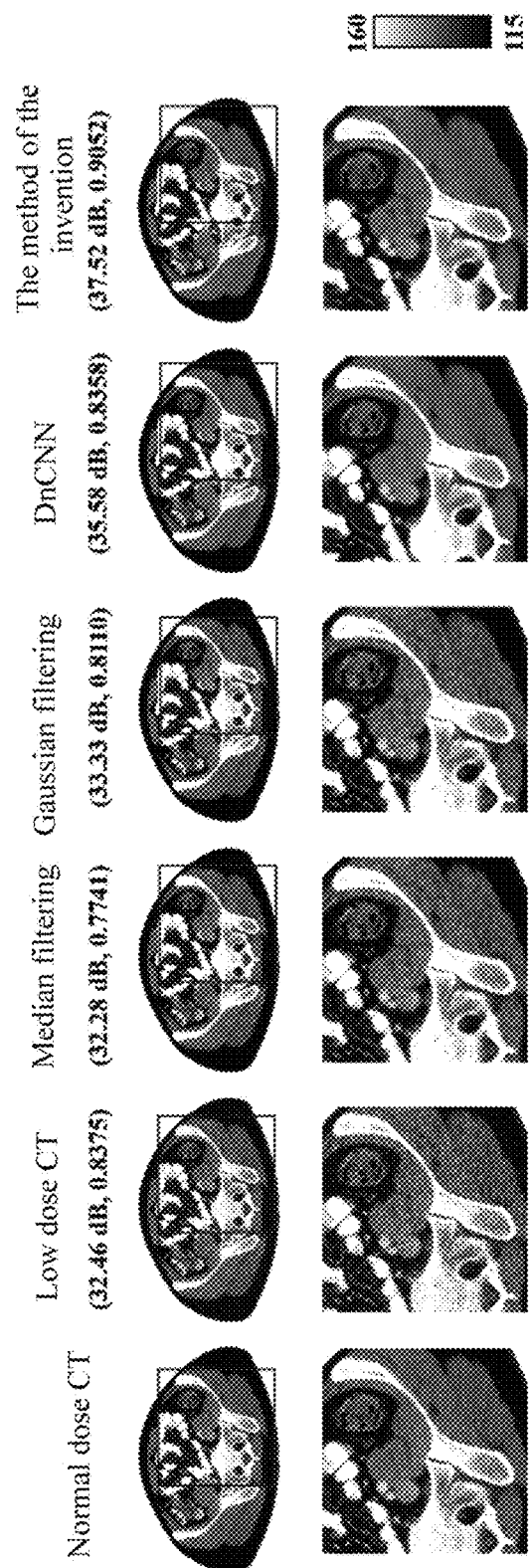
FIG. 11 is a schematic diagram of an exemplary low-dose CT denoising result.

7-2) Qualitative evaluation: the pixel value of the standardized CT is truncated to (115, 160), and the denoising results of abdominal organs are observed, as shown in FIG. 11.

Corresponding to the embodiment of the image denoising method based on wavelet high-frequency channel synthesis, the present disclosure also provides an embodiment of the image denoising apparatus based on wavelet high-frequency channel synthesis.

Figure 12:
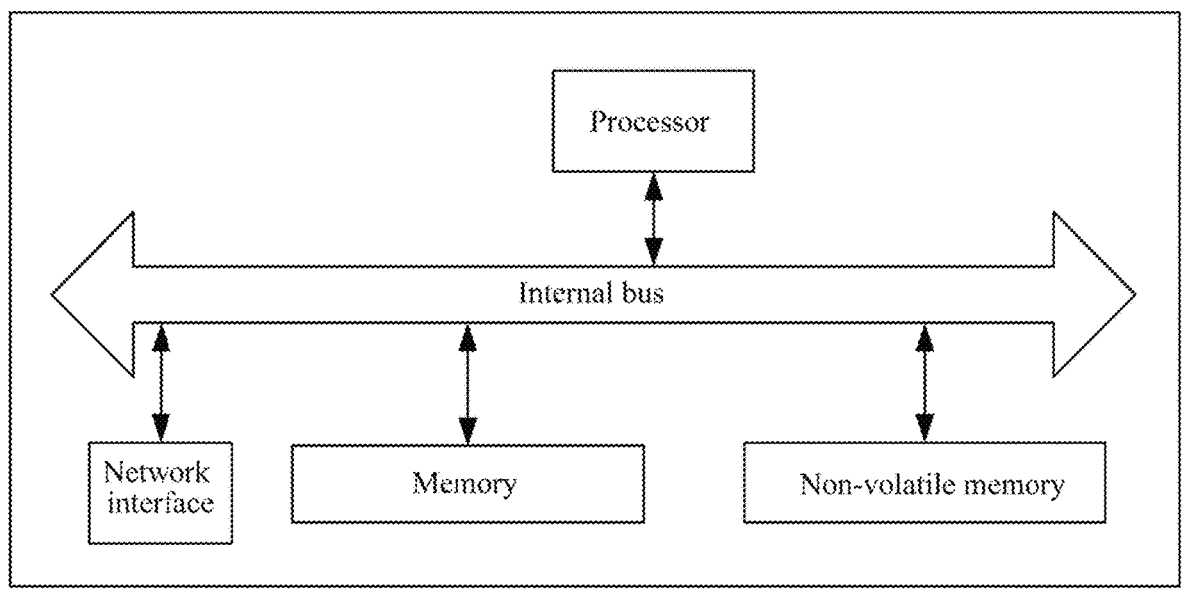
FIG. 12 is a structural diagram of an image-denoising apparatus based on wavelet high-frequency channel synthesis provided by the present disclosure.

Referring to FIG. 12, an image denoising apparatus based on wavelet high-frequency channel synthesis provided by an embodiment of the present disclosure includes a memory and one or more processors. Executable codes are stored in the memory, and when the executable codes are executed by the processors, the image denoising method based on wavelet high-frequency channel synthesis in the above embodiment is implemented The embodiment of the image denoising apparatus based on wavelet high-frequency channel synthesis of the present disclosure can be applied to any equipment with data processing capability, which can be devices or devices such as computers. The embodiment of the device can be realized by software, or by hardware, or a combination of hardware and software. Taking software implementation as an example, as a logical device, it is formed by reading the corresponding computer program instructions in the non-volatile memory into the memory through the processor of any equipment with data processing capability. From the hardware level, as shown in FIG. 12, it is a hardware structure diagram of any equipment with data processing capability where the image denoising apparatus based on wavelet high-frequency channel synthesis of the present disclosure is located. In addition to the processor, memory, network interface, and non-volatile memory shown in FIG. 12, any equipment with data processing capability where the device is located in the embodiment usually includes other hardware according to the actual functions of the equipment with data processing capability, which will not be described here again.

The implementing process of the functions and functions of each unit in the above-mentioned apparatus is detailed in the realization process of the corresponding steps in the above-mentioned method, and will not be repeated here.

For the apparatus embodiment, because it corresponds to the method embodiment, it is only necessary to refer to the part of the description of the method embodiment for the relevant points. The apparatus embodiments described above are only schematic, in which the units described as separate components may or may not be physically separated, and the components displayed as units may or may not be physical units, that is, they may be located in one place or distributed to multiple network units. Some or all of the modules can be selected according to actual needs to achieve the purpose of the scheme of the present disclosure. Ordinary technicians in this field can understand and implement it without creative labor.

The embodiment of the present disclosure also provides a computer-readable storage medium, on which a program is stored, which, when executed by a processor, implements the image denoising method based on wavelet high-frequency channel synthesis in the above embodiment.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory.

Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into computer programs by the routine work of a skilled technician or programmer.

The computer-readable storage medium can be an internal storage unit of any device with data processing capability as described in any of the previous embodiments, such as a hard disk or a memory. The computer-readable storage medium can also be an external storage device of any device with data processing capabilities, such as a plug-in hard disk, Smart Media Card (SMC), SD card, Flash Card, and the like provided on the device. Further, the computer-readable storage medium can also include both internal storage units and external storage devices of any device with data processing capability. The computer-readable storage medium is used for storing the computer program and other programs and data required by any equipment with data processing capability, and can also be used for temporarily storing data that has been output or will be output.

The above-mentioned embodiments are used to explain, rather than to limit the present disclosure. Any modification and change made to the present disclosure within the scope of protection of the spirit and claims of the present disclosure shall fall within the scope of protection of the present disclosure.

What is claimed is:

1. An image denoising method based on wavelet high-frequency channel synthesis, comprising:

step S1, obtaining noisy or high-dimensional images and preprocessing the noisy or high-dimensional images;

step S2, wavelet package transformation and wavelet package coefficient grouping, wherein the preprocessed image data and ground-truth image data are decomposed into wavelet package coefficients in different frequency channels using wavelet package transformation, signal-to-noise ratios of the wavelet package coefficients are calculated, respectively, and a "less-noise group" and a "more-noise group" are formed according to a signal-to-noise ratio threshold;

step S3, establishing a neural network, comprising a denoising submodule and a synthesis submodule, wherein the denoising submodule is a convolution neural network based on residual learning, and the synthesis submodule is a convolution neural network based on style transfer; and step S4, generative adversarial model training, comprising:

step S41, pretraining a generative network, and performing supervised training on the denoising submodule and the synthesis submodule in step S3, respectively;

step S42, reconstructing data, wherein an input of the denoising submodule is "less-noise group" wavelet coefficients, an output of the denoising submodule is denoised "less-noise group" wavelet package coefficients, and an input of the synthesis submodule is the "less-noise group" wavelet coefficients and original image data, and an output of the synthesis submodule is a synthesized wavelet package coefficient corresponding to "more-noise group" data; and wherein inverse wavelet package transformation is performed on the output of the denoising submodule and the output of the "more-noise group" of the synthesis submodule, to jointly reconstruct the original image data; and step S43, establishing a discriminative network, wherein the input of the discriminative network is the reconstructed original image data; iteratively training an adversarial model with the generative network, and reconstructing the image data from the predicted wavelet package coefficients generated from the trained generative model, namely a denoised image.

2. The image denoising method based on wavelet high-frequency channel synthesis according to claim 1, wherein in step S1, said preprocessing the noisy or high-dimensional images comprises:

data normalization: normalizing the original data and the corresponding ground-truth data using a unified graphic coding format;

data augmentation: expanding a database through clipping, interpolation, rotation, and translation; and data standardization: unifying data dimensions through a standardized method.

3. The image denoising method based on wavelet high-frequency channel synthesis according to claim 1, wherein in step S2, the coefficients in frequency domain obtained through wavelet package decomposition of both the original image data and the ground-truth image data are divided into a "less-noise group" and a "more-noise group" by calculating signal-to-noise ratios; the signal-to-noise ratio threshold is set by experience; "less-noise group" wavelet coefficients of an original noisy image are concatenated by channels to be used as the input of the denoising submodule and the synthesis submodule subsequently; "less-noise group" and "more-noise group" wavelet package coefficients corresponding to a ground-truth image are concatenated by channels to be subsequently used as supervised true labels of the denoising submodule and the synthesis submodule, respectively.

4. The image denoising method based on wavelet high-frequency channel synthesis according to claim 1, wherein in step S3, the convolution neural network based on residual learning is established to denoise the "less-noise group" wavelet package coefficients; and the convolution neural network based on residual learning comprises a plurality of convolution layers, activation layers, batch normalization layers and a plurality of residual connections, and wherein the plurality of residual connections comprises a head-to-tail residual connection, such that an optimized objective of the network is image residuals.

5. The image denoising method based on wavelet high-frequency channel synthesis according to claim 1, wherein in the step S3, the convolution neural network based on style transfer is established to synthesize the "more-noise group" wavelet package coefficients; the network comprises a reconstruction network based on U-net, a latent space network and an affine transformation layer; wherein a U-net neural network comprises a plurality of groups of corresponding encoders and decoders, and the corresponding encoders and the decoders are connected to fuse multi-dimension feature maps; the latent space network comprises a plurality of convolution layers, pooling layers, batch normalization layers and activation layers; the affine transformation layer transforms features generated in a latent space model into a U-net decoder in a form of matrix multiplication and matrix addition; an input of the convolution neural network based on style transfer is the "less-noise group" wavelet package coefficients, and an input of the latent space network is an original image, and a final output is a synthesized wavelet package coefficient corresponding to the "more-noise group".

6. The image denoising method based on wavelet high-frequency channel synthesis according to claim 1, wherein in step S41, the "less-noise group" wavelet package coefficients are fed forward to the denoising submodule and the synthesis submodule, respectively, and the predicted coefficients of the denoising submodule and the synthesis submodule are obtained, respectively; a loss function is calculated according to the predicted coefficients and the true labels; back propagation is performed to obtain a gradient, and a network weight is updated using a gradient descent algorithm; and two networks are optimized iteratively, until a loss curve is convergent.

7. The image denoising method based on wavelet high-frequency channel synthesis according to claim 1, wherein step S43 further comprises establishing a discriminator based on the convolution neural network, and the discriminative network comprises a plurality of convolution layers, batch normalization layers, pooling layers and activation layers; and an input of the discriminative network is a reconstructed image through wavelet inverse transformation, and an output is a one-dimensional probability $\in[0,1]$.

8. The image denoising method based on wavelet high-frequency channel synthesis according to claim 1, wherein in the step S43, the reconstructed images in the step S42 are provided with negative labels and ground-truth images are provided with positive labels and fed forward to the discriminator; a classification loss is calculated before the back propagations of the denoising submodule and the synthesis submodule respectively, and two generative networks are optimized using a random gradient descent algorithm; and wherein in repeated iterative optimization, when a loss functions of the generative network and the discriminative network reach a dynamic balance, the training is completed.

9. An image denoising apparatus based on wavelet high-frequency channel synthesis, comprising a memory and one or more processors, the memory storing an executable code, wherein the processor, when executing the executable code, is configured to implement the image denoising method based on wavelet high-frequency channel synthesis according to claim 1.

10. A computer readable storage medium, storing a program, wherein the program, when executed by a processor, implements the image denoising method based on wavelet high-frequency channel synthesis according to claim 1.

* * * * *